United States Patent
Nakashima (10) Patent No.: US 11,500,466 B2
(45) Date of Patent: Nov. 15, 2022

(54) IMAGE PICKUP APPARATUS WITH VIBRATION DEVICE

(71) Applicant: CANON KABUSHIKI KAISHA, Tokyo (JP)

(72) Inventor: Shinga Nakashima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/316,872

(22) Filed: May 11, 2021

(65) Prior Publication Data

US 2021/0357033 A1 Nov. 18, 2021

(30) Foreign Application Priority Data

May 15, 2020 (JP) .............................. JP2020-085766

(51) Int. Cl.
*G06F 3/01* (2006.01)
*H04N 5/232* (2006.01)

(52) U.S. Cl.
CPC .............. *G06F 3/016* (2013.01); *H04N 5/232* (2013.01)

(58) Field of Classification Search
CPC ....... G06F 3/016; G06F 3/02; H04N 5/23216; H04N 5/2254; H04N 5/23287; H04N 5/23258; H04N 5/23245; H04N 5/2252; H04N 5/2253; H04N 5/2251; H04N 5/23212; H04N 5/2328; G03B 17/14; G03B 17/18; G03B 17/02; G03B 17/563; G02B 27/646
See application file for complete search history.

(56) References Cited

U.S. PATENT DOCUMENTS

| 2016/0212328 | A1* | 7/2016 | Lee | H04N 5/232933 |
| 2017/0017137 | A1* | 1/2017 | Morita | H02N 2/062 |
| 2020/0322517 | A1* | 10/2020 | Tani | H04N 5/2328 |
| 2021/0258453 | A1* | 8/2021 | Watanabe | H04N 5/23287 |
| 2021/0271151 | A1* | 9/2021 | Seo | G03B 7/095 |
| 2021/0271325 | A1* | 9/2021 | Seo | H04N 5/2353 |

FOREIGN PATENT DOCUMENTS

| JP | 2006-136865 A | 6/2006 |
| JP | 2013-157953 A | 8/2013 |

* cited by examiner

*Primary Examiner* — Lin Ye
*Assistant Examiner* — Tuan H Le
(74) *Attorney, Agent, or Firm* — Cowan, Liebowitz & Latman, P.C.

(57) ABSTRACT

A space-saving image pickup apparatus capable of appropriately vibrating the image pickup apparatus locally or as a whole using one vibration device is provided. The image pickup apparatus comprising an operation member, a vibration device configured to generate a vibration, a vibration transmission member fixed to the vibration device, and a controller configured to drive the vibration device in response to an operation of the operation member. Part of the vibration transmission member comes into contact with part of the operation member, and the operation member vibrates due to a vibration transmitted from the vibration device via the vibration transmission member.

6 Claims, 7 Drawing Sheets

IMAGE PICKUP APPARATUS WITH VIBRATION DEVICE

BACKGROUND OF THE INVENTION

Field of the Invention

The present invention relates to an image pickup apparatus such as a digital camera having a vibration device.

Description of the Related Art

In a single-lens reflex camera, when pressing a release button to shoot a photograph, a shutter sound and a mirror drive sound are generated, so that a photographer can recognize that a shooting operation is performed by these sounds. On the other hand, when shooting a photograph with a mirrorless camera, no mirror drive sound is generated. In addition, some mirrorless cameras have a quiet shutter sound in consideration of surroundings. Therefore, when shooting a photograph with a mirrorless camera, it is difficult for the photographer to recognize whether the shooting operation is actually performed.

Therefore, there is known a technique for making the photographer aware that an operation (shooting operation) has been performed when a vibration device is provided in a camera body, and a vibration is generated by the vibration device in synchronization with a photographer's operation so that the photographer can get a feeling of operation when shooting a photograph with a mirrorless camera. In this case, there are two ways in which one way is that the operation is recognizable even when operating any operation member by vibrating the entire camera body with a large vibration device when the operation member is operated, and the other way is that a small vibration device vibrates only a specific part.

When the shutter sound is silenced during shooting, it is desirable to suppress the vibration sound by a small vibration. For example, a small vibration device is disposed directly under the release button to vibrate. By vibrating the release button slightly in this way, it is possible to make the photographer aware that the shooting operation has been performed while preventing the surrounding people from hearing the vibration sound during the shooting operation.

As a specific example, Japanese Laid-Open Patent Publication (kokai) No. 2013-157953 discloses an image pickup apparatus that gives a photographer a feeling of operation by disposing a vibration device (piezoelectric actuator) directly under a release button or the like that can be pressed to cause the vibration device to generate vibration in response to the pressing operation. Japanese Laid-Open Patent Publication (kokai) No. 2006-136865 discloses an image pickup apparatus that allows a photographer to perceive a direction in which a subject can be properly picked up (provides information that assists a photographing direction) when generating vibration by disposing a vibration device at a release button or a grip portion held by the photographer.

However, when disposing the vibration device so that only the operation member vibrates as in the image pickup apparatus described in Japanese Laid-Open Patent Publication (kokai) No. 2013-157953, it is necessary to provide a small vibration device for each operation member, so that the size of the image pickup apparatus increases as the number of parts increases, and manufacturing costs will also increase. Further, even in a configuration in which a small vibration device is disposed directly under the release button, and a large vibration device is disposed on the grip portion as in the image pickup apparatus described in Japanese Laid-Open Patent Publication (kokai) No. 2006-136865, the size of an image pickup apparatus main body is large.

SUMMARY OF THE INVENTION

The present invention provides a space-saving image pickup apparatus capable of appropriately vibrating the image pickup apparatus locally or as a whole using one vibration device.

Accordingly, the present invention provides an image pickup apparatus comprising an operation member, a vibration device configured to generate a vibration, a vibration transmission member fixed to the vibration device, and a controller configured to drive the vibration device in response to an operation of the operation member, wherein part of the vibration transmission member comes into contact with part of the operation member, and the operation member vibrates due to a vibration transmitted from the vibration device via the vibration transmission member.

According to the present invention, it is possible to realize a space-saving image pickup apparatus capable of appropriately vibrating the image pickup apparatus locally or as a whole by using one vibration device.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
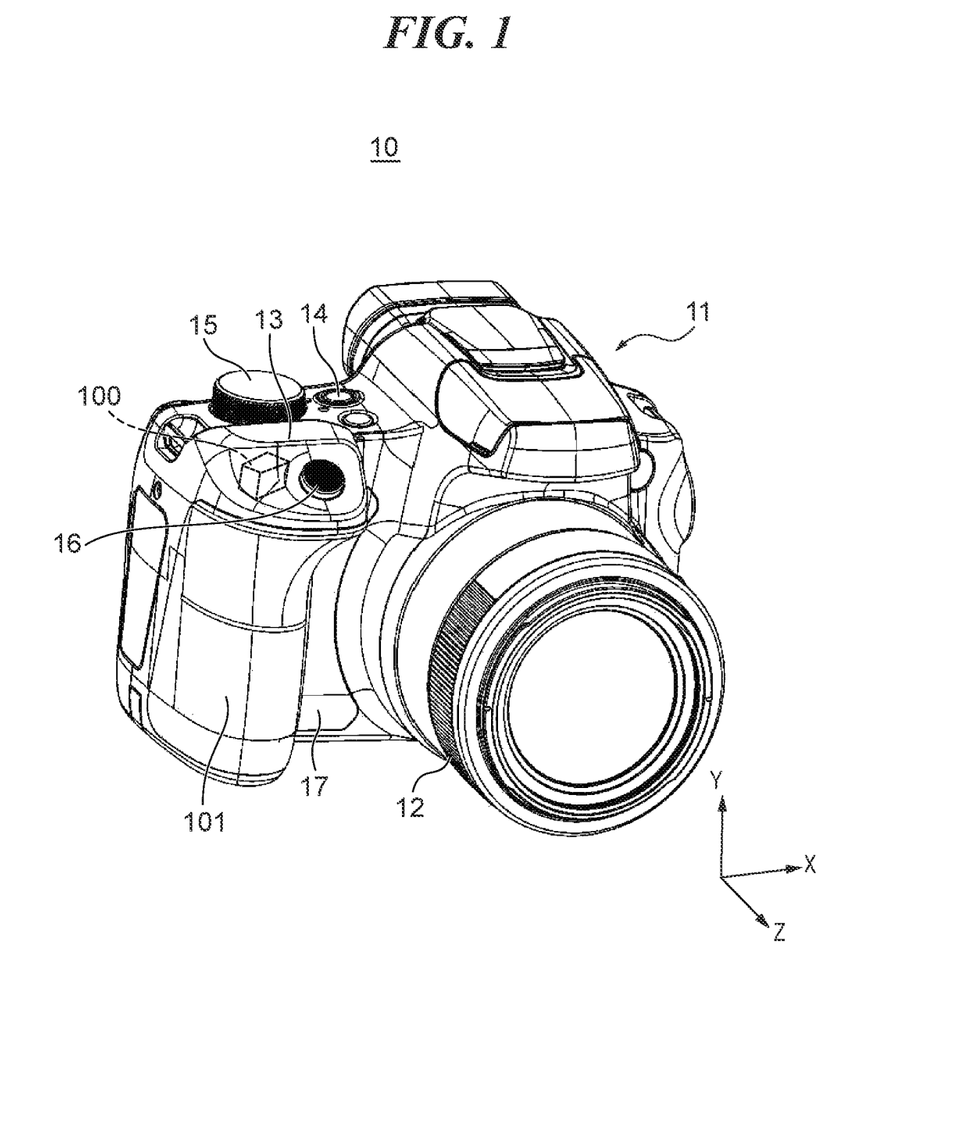
FIG. 1 is a first external perspective view of an image pickup apparatus according to an embodiment.
Figure 2A:
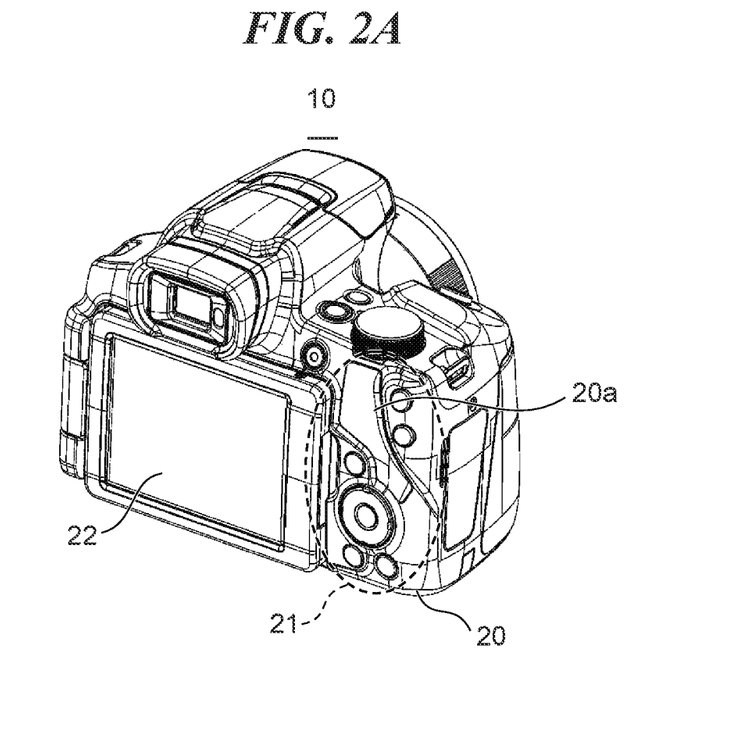
FIGS. 2A and 2B are a second external perspective view and a bottom view of the image pickup apparatus in FIG. 1.
Figure 2B:
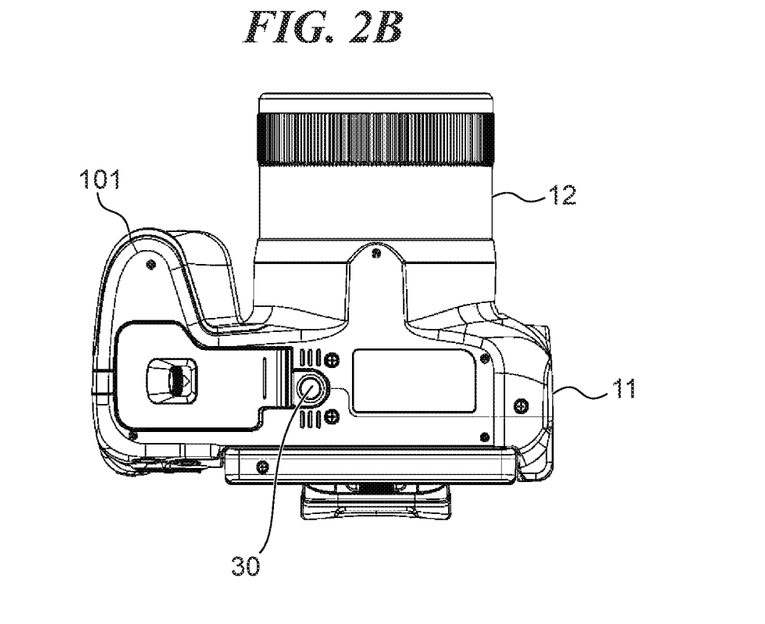

FIG. 1 is an external perspective view showing an image pickup apparatus 10 according to the embodiment of the present invention when viewed from diagonally front and diagonally above. FIG. 2A is an external perspective view showing the image pickup apparatus 10 when viewed from diagonally rear and diagonally above. FIG. 2B is a bottom view of the image pickup apparatus 10. The image pickup apparatus 10 includes an image pickup apparatus main body 11 and an interchangeable lens 12 (lens barrel) that can be attached to and detached from the image pickup apparatus main body 11.

It should be noted that for convenience of explanation, an orthogonal coordinate axes shown in FIG. 1 are defined. An optical axis direction in which an optical axis of the interchangeable lens 12 extends is a Z direction, and directions orthogonal to the Z direction are an X direction and a Y direction. When the Z axis is parallel to the horizontal direction, the X axis is also parallel to the horizontal direction, and the Y axis is parallel to the vertical direction. A rotation direction around the X axis is a pitch direction, the rotation direction around the Y axis is a yaw direction, and a rotation direction around the Z axis is a roll direction.

A front face of the image pickup apparatus main body 11 is composed of a front cover unit 17 as a first appearance component (exterior component), and a lens interchangeable mount (not shown) is provided in the center of the front cover unit 17. The interchangeable lens 12 mounted on the lens interchangeable mount forms an image of light from a subject as a subject image (optical image) on an image pickup device 126 (see FIG. 4) disposed inside the image pickup apparatus main body 11.

A front grip portion 101 is provided at a left side (-X side) of the front cover unit 17 when viewed from the front (subject side (not shown)) so that a photographer can grip the image pickup apparatus 10 with his/her right hand. The front grip portion 101 protrudes forward of the lens interchangeable mount provided on the front cover unit 17, and has a shape that allows the photographer to easily hold it with his/her hand (middle finger or ring finger). A release button 16 is disposed on an upper face of the front grip portion 101, and the photographer who holds the front grip portion 101 with his/her right hand can operate the release button 16 with an index finger of his/her right hand.

The upper face of the image pickup apparatus 10 is configured by a top cover unit 13 as a second appearance component. The top cover unit 13 is provided with a power button 14, a mode dial 15 for switching an image pickup mode, and the release button 16. When the photographer presses the power button 14 while a power of the image pickup apparatus 10 is off, the image pickup apparatus 10 is turned on and image pickup is possible. The photographer can set a desired image pickup mode by rotating the mode dial 15 to select a rotation position (operation position) while the power is on. Settable image pickup modes include a manual still image pickup mode in which the photographer can arbitrarily set image pickup conditions such as a shutter speed and an aperture value, an automatic still image pickup mode in which an appropriate exposure amount is automatically obtained, a moving image pickup mode for picking up video, and the like. A vibration device 100 is attached to the top cover unit 13 and disposed inside the image pickup apparatus main body 11 and in the vicinity of the release button 16. The details of the vibration device 100 will be described later.

A rear face of the image pickup apparatus 10 is configured by a rear cover unit 20 as a third appearance component, a rear operation unit 21 provided on the rear cover unit 20, and a display unit 22. The rear operation unit 21 includes a plurality of buttons, a rotary sub-dial, and the like, and is provided at a lower side of a rear grip portion 20a, of the rear cover unit 20, on which the photographer puts his/her thumb when grasping the image pickup apparatus 10 (front grip portion 101).

When the image pickup apparatus 10 is in a power-on state and the image pickup mode of the still image or the moving image is set, a through image of the subject image picked up by the image pickup device 126 is displayed on the display unit 22. Further, the display unit 22 displays image pickup parameters indicating image pickup conditions such as the shutter speed and the aperture value, and the photographer changes set values of the image pickup parameters by operating the rear operation unit 21 while viewing the display. When the display unit 22 has a touch panel function, the set values of the image pickup parameters can be changed by a touch operation (slide operation) on a slider displayed on the display unit 22. The rear operation unit 21 includes a play button for instructing replay of a recorded picked up image, and when the photographer operates the play button, the picked up image is reproduced and displayed on the display unit 22. A tripod mount 30 that attaches accessory equipment such as a tripod or a jacket is provided on a bottom face of the image pickup apparatus 10.

Figure 3:
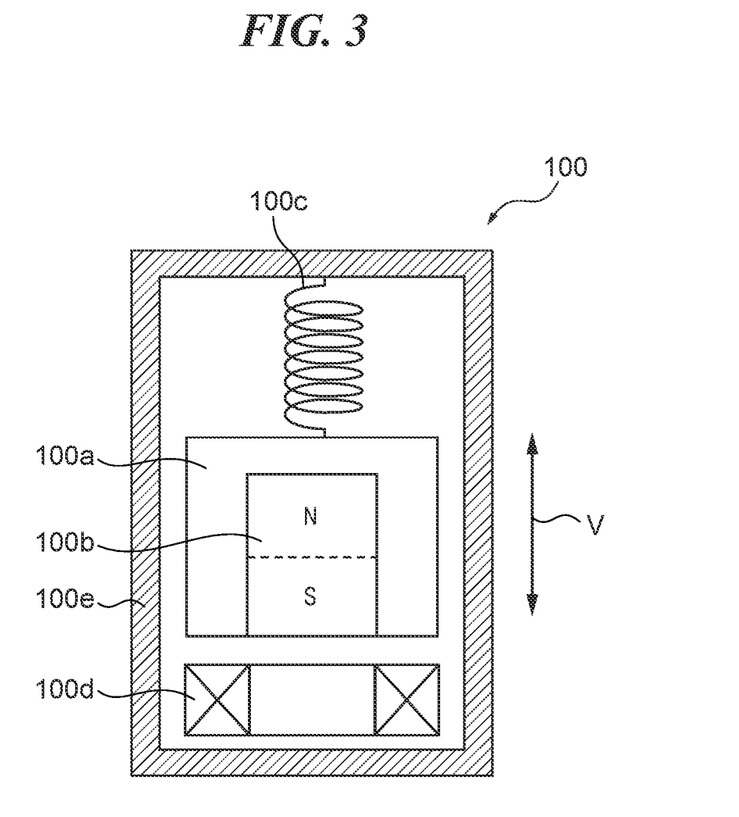
FIG. 3 is a cross-sectional view showing a schematic configuration of a vibration device included in the image pickup apparatus in FIG. 1.

Here, the configuration of the vibration device 100 will be described, FIG. 3 is a cross-sectional view showing a schematic configuration of the vibration device 100. In the present embodiment, the vibration device 100 is of a linear resonant actuator (LRA) type, but the vibration device 100 is not limited to this.

The vibration device 100 includes an oscillator 100a, a spring 100c, a coil 100d, and a base member 100e, and the oscillator 100a includes a magnet 100b. The oscillator 100a including the magnet 100b is connected to the base member 100e via the spring 100c, and can move in an expansion/contraction direction of the spring 100c. The coil 100d is disposed in the vicinity of the magnet 100b, and is electrically connected to a circuit board (not shown) disposed inside the image pickup apparatus main body 11 via a flexible printed board or the like. The coil 100d generates an electromagnetic force when a current is applied from the circuit board, and the oscillator 100a reciprocates in the expansion/contraction direction of the spring 100c due to the generated electromagnetic force and an attractive force and a repulsive force between the coil 100d and the magnet 100b. As a result, the vibration device 100 vibrates in a direction indicated by an arrow V in FIG. 3 (hereinafter referred to as a "vibration direction V").

Figure 4:
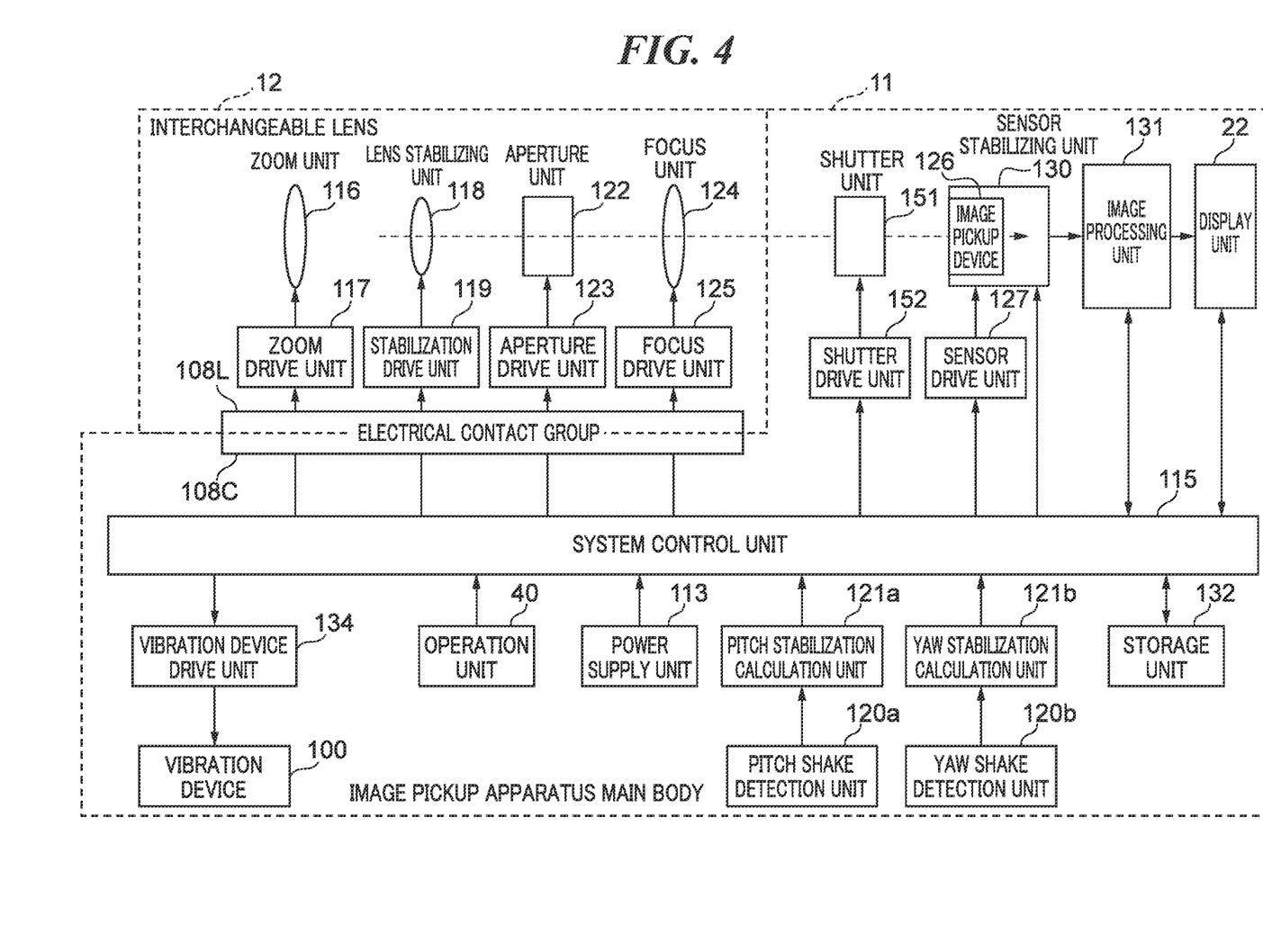
FIG. 4 is a block diagram showing electrical and optical configurations of the image pickup apparatus in FIG. 1.

FIG. 4 is a block diagram showing electrical and optical configurations of the image pickup apparatus 10. The interchangeable lens 12 includes a zoom unit 116, a zoom drive unit 117, a lens stabilizing unit 118, a stabilization drive unit 119, an aperture unit 122, an aperture drive unit 123, a focus unit 124, a focus drive unit 125, and an electrical contact group 108L.

The image pickup apparatus main body 11 includes an electrical contact group 108C, a system control unit 115, a shutter unit 151, a shutter drive unit 152, a sensor stabilizing unit 130, a sensor drive unit 127, an image processing unit 131, and the display unit 22, and the sensor stabilizing unit 130 includes the image pickup device 126. Further, the image pickup apparatus main body 11 includes the vibration device 100, a vibration device drive unit 134, an operation unit 40, a power supply unit 113, a pitch shake detection unit 120a, a pitch stabilization calculation unit 121a, a yaw shake detection unit 120b, and a yaw stabilization calculation unit 121b, and a storage unit 132.

The zoom unit 116 includes a zoom lens that moves in the optical axis direction to change magnification. The zoom drive unit 117 moves the zoom unit 116 (zoom lens) in the optical axis direction. The lens stabilizing unit 118 includes a shift lens movably disposed in an XY plane orthogonal to the optical axis. The stabilization drive unit 119 moves the shift lens in the XY plane. The aperture unit 122 adjusts an amount of light incident on the image pickup device 126, and the aperture drive unit 123 drives the aperture unit 122. The focus unit 124 includes a focus lens that moves in the optical axis direction to perform focus adjustment (focusing). The focus drive unit 125 performs a focusing operation by moving the focus lens in the optical axis direction.

When the interchangeable lens 12 is attached to the lens interchangeable mount of the image pickup apparatus main body 11, the electrical contact group 108L is electrically connected to the electrical contact group 108C provided on the image pickup apparatus main body 11, enables communication and power supply between the image pickup apparatus main body 11 and the interchangeable lens 12.

The power supply unit 113 supplies necessary power to each part of the image pickup apparatus main body 11 and the interchangeable lens 12. The operation unit 40 includes the power button 14, the mode dial 15, the release button 16, the rear operation unit 21, and the like described with reference to FIGS. 1 and 2. The system control unit 115 controls the entire image pickup apparatus 10 by reading and executing a control program stored in a memory (not shown). The system control unit 115 communicates with each drive unit of the interchangeable lens 12 via the electrical contact groups 108C and 108L.

The system control unit 115 controls the drive of the aperture unit 122 via the aperture drive unit 123 of the interchangeable lens 12 based on the set value of the aperture value received from the operation unit 40 or a luminance signal acquired from the image processing unit 131. Further, the system control unit 115 controls the drive of the focus unit 124 via the focus drive unit 125 of the interchangeable lens 12 based on a focus signal acquired from the image processing unit 131. As a result, an autofocus operation is realized.

The incident light that has passed through the interchangeable lens 12 is imaged on an image pickup plane of the image pickup device 126, and the image pickup device 126 converts the optical image into an electrical signal (image pick up signal) to output it to the image processing unit 131. The shutter unit 151 includes a mechanical focal plane shutter. The shutter drive unit 152 controls an exposure of the image pickup device 126 by driving the shutter unit 151 in accordance with an instruction from the system control unit 115.

The sensor drive unit 127 drives the sensor stabilizing unit 130 so as to move the image pickup device 126 in the XY plane orthogonal to the optical axis. The pitch stabilization calculation unit 121a calculates shift positions of the lens stabilizing unit 118 (shift lens) and the sensor stabilizing unit 130 (image pickup device 126) in the Y-axis direction using a shake signal from the pitch shake detection unit 120a. The yaw stabilization calculation unit 121b calculates shift positions of the lens stabilizing unit 118 and the sensor stabilizing unit 130 in the X-axis direction using a shake signal from the yaw shake detection unit 120b. The system control unit 115 controls the shift position of the lens stabilizing unit 118 (image pickup device 126) via the sensor drive unit 127 according to the shift position in the pitch direction and the yaw direction calculated by the pitch stabilization calculation unit 121a and the yaw stabilization calculation unit 121b. As a result, an image shake correction (reduction) operation (stabilizing operation in the body) of the image pickup apparatus main body H is performed. Similarly, the system control unit 115 controls the shift position of the lens stabilizing unit 118 via the stabilization drive unit 119 according to the shift positions in the pitch direction and the yaw direction calculated by the pitch stabilization calculation unit 121a and the yaw stabilization calculation unit 121b. As a result, the image shake correction (reduction) operation (stabilizing operation in the lens) of the interchangeable lens 12 is performed.

The image processing unit 131 performs various image processing on the image pickup signal to generate an image signal. The storage unit 132 is an SD card or the like to store the image signal generated by the image processing unit 131. The display unit 22 is a liquid crystal panel or the like, and displays an image signal (through image) output from the image processing unit 131, a picked up image stored in the storage unit 132, a menu for making various settings in the image pickup apparatus 10, and the like.

The vibration device drive unit 134 drives the vibration device 100. When the system control unit 115 detects the operation of the operation unit 40 including the release button 16, the system control unit 115 drives the vibration device 100 via the vibration device drive unit 134 to generate vibration in the vibration device 100. The vibration generated by the vibration device 100 is transmitted to a chassis not shown) of the image pickup apparatus 10 to which the top cover unit 13 is fastened in addition to the release button 16 and the top cover unit 13. As a result, the photographer can recognize that the operation has been performed by feeling the vibration when the operation unit 40 is operated. For example, when the photographer operates the release button 16, the vibration is transmitted to a finger using which the operation is performed and a palm holding the front grip portion 101, so that the photographer can recognize that a release operation has been performed reliably.

Figure 5:
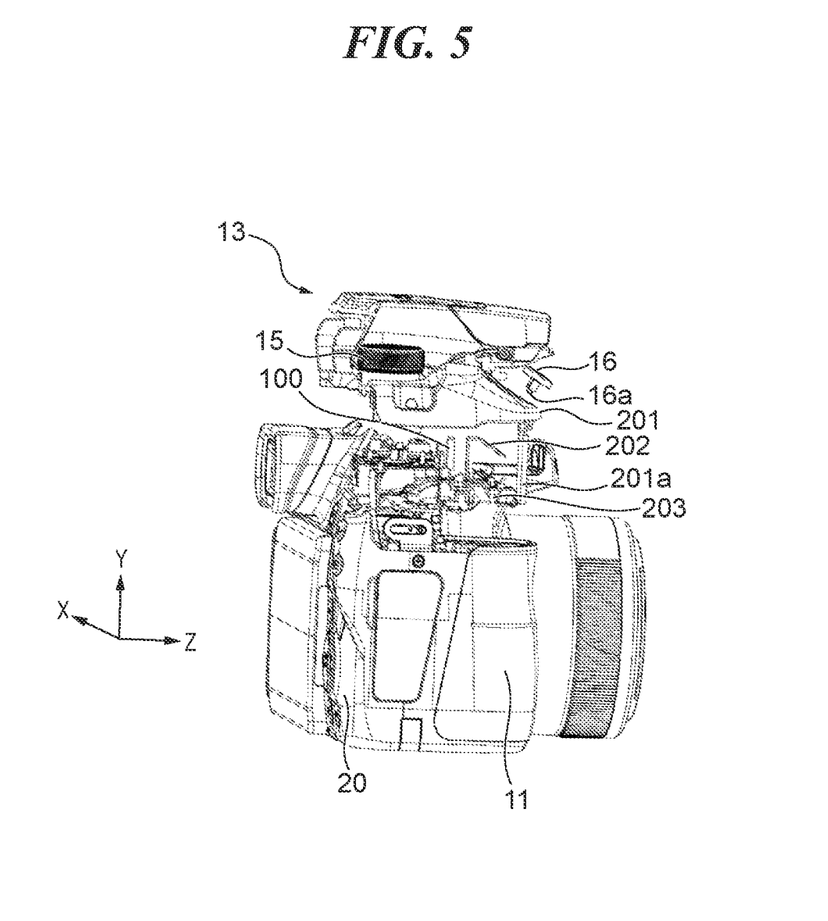
FIG. 5 is a perspective view showing the image pickup apparatus in FIG. 1 with a top cover unit separated.

FIG. 5 is an exploded perspective view of the image pickup apparatus 10 with the top cover unit 13 separated. As described above, the appearance of the image pickup apparatus 10 is mainly configured, as the appearance components, by the front cover unit 17 forming the front face, the rear cover unit 20 forming the rear face, and the top cover unit 13 forming the top face.

The top cover unit 13 is mainly composed of a top cover 201. The top cover 201 includes the power button 14 (see FIG. 1), the mode dial 15, and the release button 16. It should be noted that FIG. 5 shows the release button 16 separated from the top cover 201. A pushing portion 16a that protrudes toward the inside of the image pickup apparatus main body 11 is provided under the release button 16.

The pushing portion 16a is in contact with one end of a vibration transmission member 202 disposed inside the top cover 201. The vibration transmission member 202 is a plate-shaped member made of a metal having a spring property such as stainless steel or copper and having a small vibration loss coefficient. Part of the vibration transmission member 202 is fixed to the vibration device 100 with a double-sided tape (not shown), an adhesive or the like.

The vibration device 100 is disposed so that left and right long sides in FIG. 3 are parallel to the Y axis so as to vibrate in the Y direction. The vibration device 100 is electrically connected to the vibration device drive unit 134 by wiring (not shown) such as a flexible printed board or a cable, and the system control unit 115 controls the drive of the vibration device 100 via the vibration device drive unit 134.

When the vibration device 100 vibrates, the vibration transmission member 202 fixed to the vibration device 100 vibrates. At this time, since the vibration transmission member 202 is made of a metal having a small vibration loss coefficient, the vibration generated by the vibration device 100 is transmitted to the entire vibration transmission member 202 with little loss.

It should be noted that in the present embodiment, since the box-shaped LRA type (see FIG. 3) is used as the vibration device 100, the vibration transmission member 202 can be fixed to the vibration device 100 by using the double-sided tape or the adhesive. However, the method is not limited to this, and the vibration transmission member 202 may be fixed to the vibration device 100 by providing a screw seat in part of the vibration device 100. Further, one of reasons why the LRA type vibration device 100 is used in the present embodiment is that the LRA type vibration device can easily generate a vibration of any magnitude from a large vibration to a small vibration. However, the vibration device applicable to the image pickup apparatus 10 is not limited to the LRA type, and an oscillator (vibrating body) using a piezoelectric element or an eccentric motor may be used to vibrate the vibration transmission member 202.

A release switch 300 (FIG. 6) is disposed on a face, of the vibration transmission member 202, opposite to a face in contact with the pushing portion 16a of the release button 16. A tact switch type is used as the release switch 300, but the release switch 300 is not limited to this type. The release switch 300 is electrically connected to the system control unit 115 by a flexible printed board (not shown) or the like.

Figure 6:
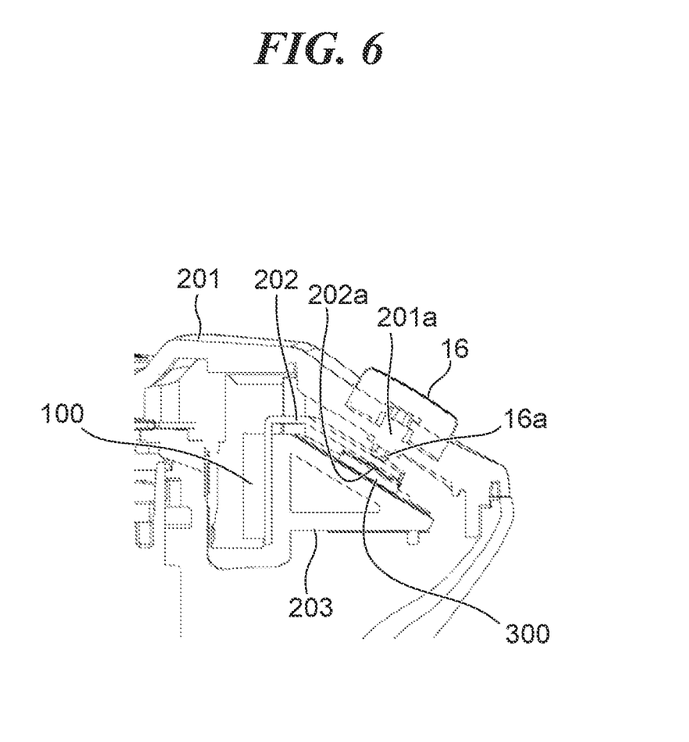
FIG. 6 is a cross-sectional view showing a peripheral configuration of the vibration device included in the image pickup apparatus in FIG. 1.

Here, the release switch 300 is a two-stage switch. When the release button 16 is pressed halfway, a first switch of the release switch 300 is turned on, and the system control unit 115 starts an image pickup preparation operation accordingly. Further, when the release button 16 is fully pressed, a second switch of the release switch 300 is turned on, and the system control unit 115 starts an image pickup operation accordingly.

The vibration transmission member 202 and the release switch 300 are attached to a holder 203, which is a holding member that holds the vibration device 100 via the vibration transmission member 202, and the holder 203 is fixed to the top cover 201 with a screw (not shown). The top cover 201 has a top cover engagement portion 201a, and the front cover unit 17 has a front cover engagement portion (not shown). At these engagement portions, the top cover 201 engages with and is connected to the front cover unit 17. As a result, when the vibration transmission member 202 vibrates due to the vibration generated by the vibration device 100, the vibration of the vibration transmission member 202 is transmitted to the holder 203, and further transmitted from the holder 203 to the top cover 201. Then, the vibration transmitted to the top cover 201 is transmitted to the front cover unit 17 via the top cover engagement portion 201a.

FIG. 6 is a cross-sectional view showing a peripheral configuration of the vibration device 100 and the release button 16. The release button 16 is held by the top cover 201 without rattling by fitting the top cover engagement portion 201a of the top cover 201 to the midway of the pushing portion 16a of the release button 16. The release button 16 has a claw portion or an E-ring (not shown), and has a structure in which it does not fall off by engaging with the top cover 201.

A tip of the pushing portion 16a of the release button 16 is in contact with part of the vibration transmission member 202. Here, since the vibration transmission member 202 has a spring property, the portion, of the vibration transmission member 202, that is in contact with the pushing portion 16a is urged in a direction opposite to a pushing direction of the release button 16. That is, the pushing portion 16a is constantly urged in the direction opposite to the pushing direction by the vibration transmission member 202. Then, even when the photographer pushes the release button 16, the pushing portion 16a returns to a predetermined position due to an urging force of the vibration transmission member 202.

As described above, the release switch 300 is disposed so as to face the release button 16 with the vibration transmission member 202 interposed therebetween. A protrusion having a projection shape toward the release switch 300 (hereinafter referred to as a "transmission member protrusion 202a") is formed at a portion, of the vibration transmission member 202, with which the pushing portion 16a of the release button 16 is in contact. The transmission member protrusion 202a is provided so as to be located substantially at a center of the release switch 300 when viewed from the pushing direction of the release button 16.

With such a configuration, when the photographer presses the release button 16, the pushing portion 16a of the release button 16 pushes down the vibration transmission member 202, and the release switch 300 is operated via the transmission member protrusion 202a of the vibration transmission member 202. When the release button 16 is pushed to a half-pressed position, the vibration transmission member 202 is elastically deformed, and the release switch 300 is pushed to a position where the first switch is turned on. When the first switch is turned on, the focus drive unit 125 drives the focus unit 124 to adjust the focus, and the aperture drive unit 123 drives the aperture unit 122 to perform the automatic exposure adjustment (AE) under the control of the system control unit 115. In addition, the system control unit 115 performs pickup preparation such as automatic white balance (AWB) processing and flash pre-flash (EF) processing. When the release button 16 is pushed from the half-pressed position to a fully-pressed position, the second switch of the release switch 300 is turned on. When the second switch is turned on, the shutter drive unit 152 drives the shutter unit 151, and the optical image formed by the interchangeable lens 12 is exposed to the image pickup device 126 under the control of the system control unit 115. Since well-known techniques can be used for the operation of the image pickup device 126 and a process of the image pickup signal output from the image pickup device 126, the description thereof is omitted here.

Next, a timing and an effect of vibrating the vibration device 100 will be described. As described above, when the vibration device 100 is driven to vibrate the vibration transmission member 202, the vibration is transmitted to the holder 203 via the vibration transmission member 202 because the vibration transmission member 202 is firmly fixed to the holder 203. Then, the vibration is transmitted to the top cover 201 to which the holder 203 is fixed via the holder 203, and further, the vibration is transmitted to the front cover unit 17 which is engaged with the top cover 201. Further, the top cover 201 and the front cover unit 17 are connected to the rear cover unit 20, and therefore, the vibration also is transmitted to the rear cover unit 20 via the top cover 201 and the front cover unit 17. In this way, the entire image pickup apparatus 10 can be vibrated.

The entire image pickup apparatus 10 can be vibrated by using the operation for various operating devices included in the operation unit 40 as a trigger that drives the vibration device 100. As a result, the photographer can recognize that the operation on the operation unit 40 has been surely executed by sensing the vibration.

Since the vibration transmission member 202 is in direct contact with the pushing portion 16a of the release button 16, even a weak vibration (vibration with a small amplitude) generated by the vibration device 100 can be transmitted to the photographer's finger touching the release button 16. That is, only the release button 16 can be vibrated without substantially vibrating the entire image pickup apparatus 10. For example, the drive of the vibration device 100 can be controlled so that when the release button 16 is half-pressed, a small vibration is generated, and when the release button 16 is fully pressed, a vibration relatively larger than the vibration when the release button 16 is half-pressed is generated. As a result, the photographer can recognize that the operation of the release button 16 has been executed by sensing the vibration. It should be noted that in the image pickup preparation operation, the photographer can recognize that the image pickup preparation operation is being executed by a change in a degree of blurring of the subject due to the autofocus operation, so that the vibration device 100 may be driven only when the release button 16 is fully pressed. Further, when the image pickup operation is completed, a short-time (instantaneous) vibration may be generated in order to inform the photographer that the image pickup operation is completed. Further, the vibration device 100 may be driven by the photographer at a desired timing. It should be noted that needless to say, the magnitude of vibration generated in the vibration device 100 is limited to a range in which the image pickup preparation operation and the image pickup operation are not adversely affected.

In the above embodiment, as shown in FIGS. 5 and 6, the vibration device 100 is disposed so that the vibration direction V matches the Y direction, but the direction in which the vibration device 100 is disposed is not limited to the Y direction. A variation of an arrangement form of the vibration device 100 will be described with reference to FIG. 7.

Figure 7:
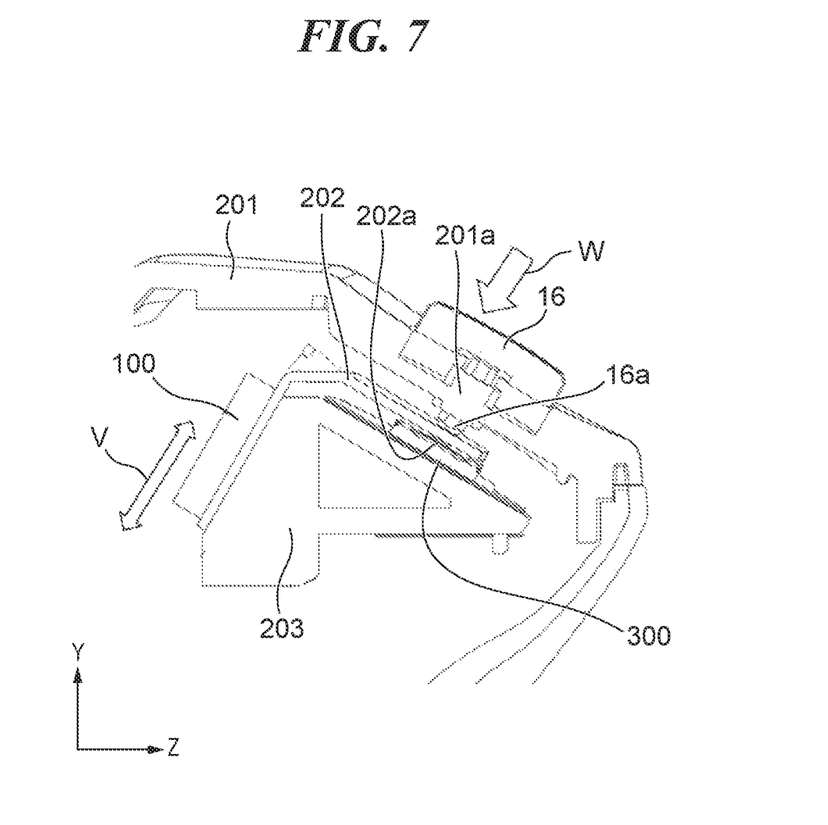
FIG. 7 is a cross-sectional view showing another arrangement example of the vibration device in the image pickup apparatus in FIG. 1.

FIG. 7 is a cross-sectional view showing another arrangement example of the vibration device 100. In FIG. 7, the vibration device 100 is disposed so that the vibration direction V is substantially parallel to the pushing direction W of the release button 16. As a result, the vibration generated by the vibration device 100 can be transmitted to the pushing portion 16a more efficiently, and the photographer can perceive the vibration more sensitively.

As described above, in the image pickup apparatus 10 according to the present embodiment, the vibration transmission member 202 is attached to the vibration device 100, and the vibration transmission member 202 is brought into direct contact with the release button 16. As a result, the vibration generated by the vibration device 100 can be efficiently transmitted to the release button 16 via the vibration transmission member 202, and the vibration can be transmitted with high sensitivity to the photographer's finger by which the release button 16 is operated. Further, in the image pickup apparatus 10, the vibration of the vibration device 100 can be transmitted to the appearance components touched by the photographer. Therefore, one vibration device 100 can vibrate not only the release button 16 with a weak vibration but also the entire image pickup apparatus 10 with a strong vibration. The image pickup apparatus 10 can be miniaturized, and an increase in component cost can be avoided since a plurality of vibration devices is not required.

In addition, when the image pickup apparatus 10 has a silent shutter sound, it is possible to make the best use of features of the silent shutter mechanism by vibrating the vibration device 100 weakly to substantially vibrate only the release button 16. On the other hand, when it is not necessary to consider the sound to the surroundings, it is possible to make the photographer aware that the operation for the operation member other than the release button 16 has been executed by vibrating the vibration device 100 strongly to vibrate the entire image pickup apparatus 10. In this way, it is possible to make the photographer surely recognize that the operation has been executed in a space-saving configuration without using the vibration device 100 in a complicated configuration.

It should be noted that in the above embodiment, the part of the vibration transmission member 202 is brought into contact with the pushing portion 16a of the release button 16, and the vibration transmission member 202 is disposed between the release button 16 and the release switch 300. The configuration is not limited to this, and vibration may be transmitted to the release button 16 by part of the release button 16 and part of the vibration transmission member 202 engaging or coming into contact with each other. Further, the release switch 300 has the tact switch provided with the two-stage switch, but the present invention is not limited to this, and a switch that detects contact resistance using a leaf spring may be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-085766, filed May 15, 2020, which is hereby incorporated by reference herein in its entirety.

What is claimed is:

1. An image pickup apparatus comprising:
a release button configured to be manually pushed;
a vibration device configured to generate a vibration;
a vibration transmission member fixed to the vibration device and comprising a protrusion, the vibration transmission member being in contact with a part of the release button and being made of a metal that has a spring property that urges the release button being pushed, in a direction opposite to a pushing direction of the release button either while the vibration device is generating a vibration or while the vibration device does not generate a vibration;

a release switch configured to be pressed by the protrusion of the vibration transmission member pressed by the part of the release button when the release button is manually pushed; and a controller configured to drive the vibration device in response to the release button being manually pushed, wherein the release button vibrates due to a vibration transmitted from the vibration device via the vibration transmission member in contact with the part of the release button.

2. The image pickup apparatus according to claim 1, further comprising:

an image pickup device;

wherein the release switch generates a signal for causing the image pickup device to start an image pickup operation in response to an operation of the release button, wherein the part of the release button protrudes in the pushing direction of the release button so as to come into contact with the vibration transmission member, the protrusion of the vibration transmission member protrudes so as to come into contact with the release switch.

3. The image pickup apparatus according to claim 1, wherein the vibration transmission member urges the part of the release button in the direction opposite to the pushing direction of the release button.

4. The image pickup apparatus according to claim 1, wherein a vibration direction of a vibration generated by the vibration device is parallel to the pushing direction of the release button.

5. The image pickup apparatus according to claim 1, further comprising:

a first appearance component configured to form a grip portion for gripping the image pickup apparatus and have a front face of the image pickup apparatus;

a second appearance component configured to have an upper face of the image pickup apparatus and engage with the first appearance component; and a holding member configured to be fixed to the second appearance component and hold the vibration transmission member, wherein the first appearance component is configured to be vibrated through the vibration transmission member, the holding member, and the second appearance component by driving the vibration device.

6. The image pickup apparatus according to claim 5, further comprising;

a third appearance component connected to the first appearance component and the second appearance component; and an operating device provided in the third appearance component, wherein when the operating device is operated, the controller controls intensity of a vibration generated by the vibration device so that the third appearance component is vibrated due to a vibration transmitted through the vibration transmission member, the holding member, and at least the second appearance component.

* * * * *